Figure 1A:
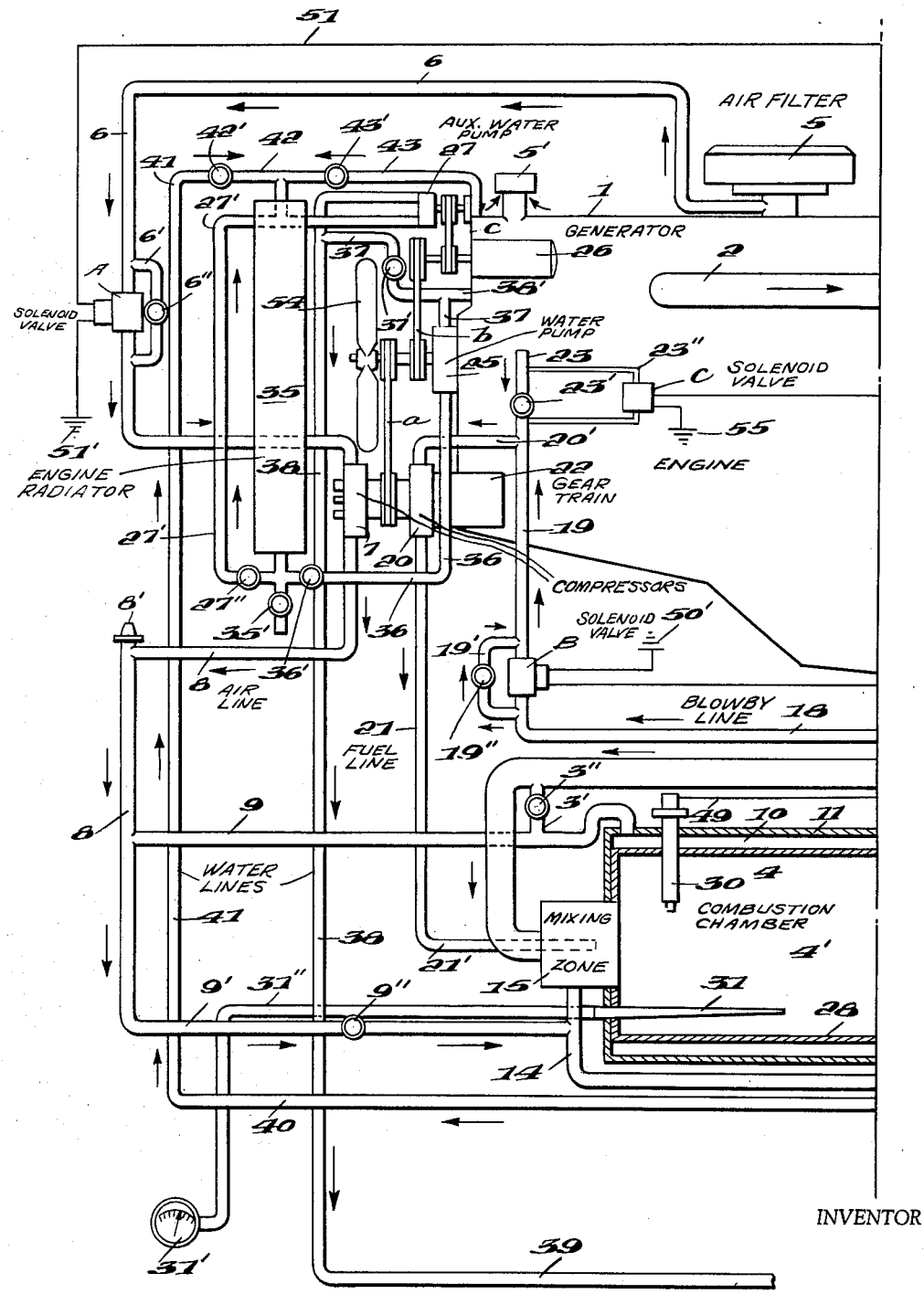

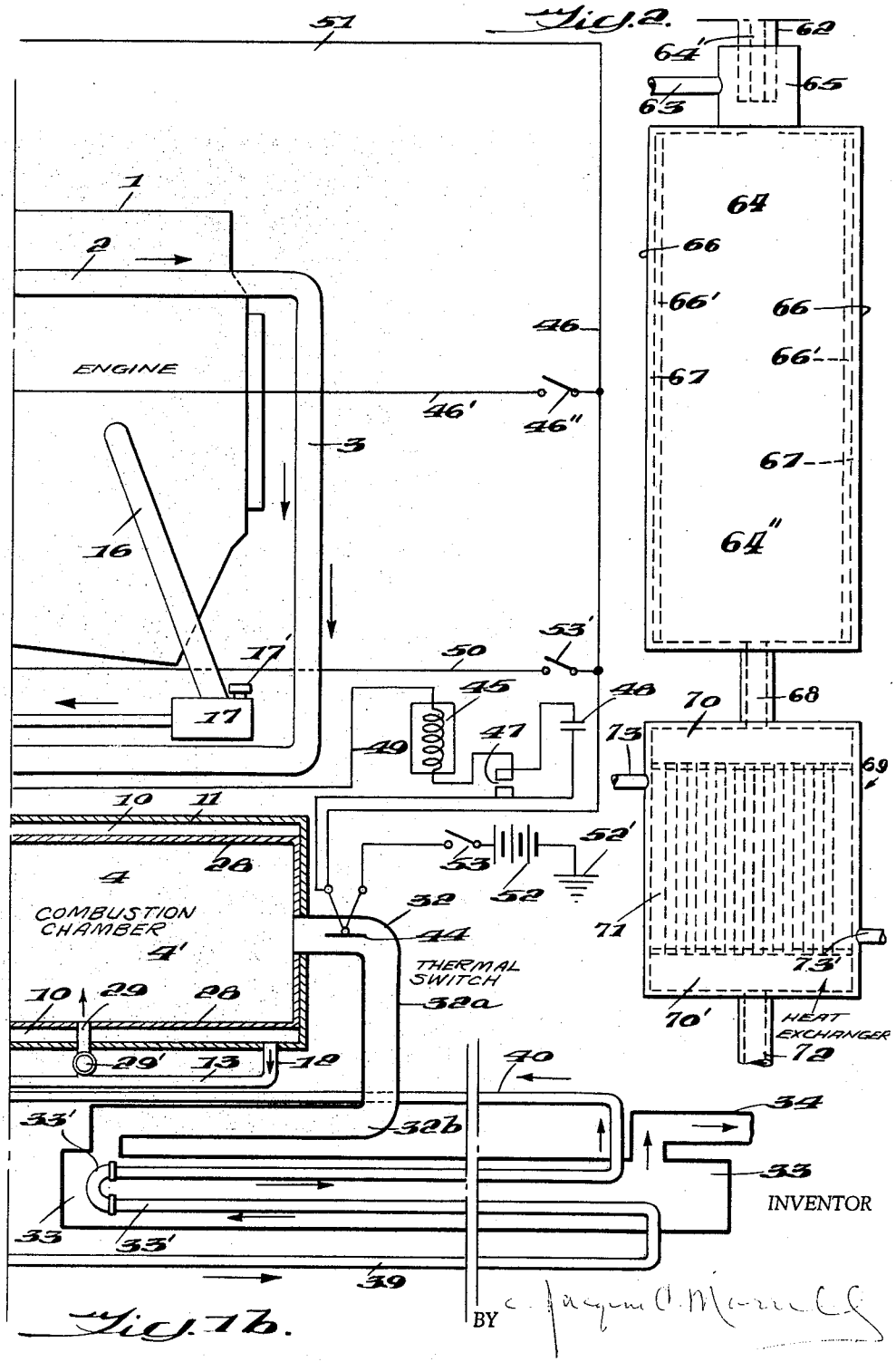

United States Patent Office 3,248,872
Patented May 3, 1966

3,248,872
APPARATUS AND PROCESS FOR TREATMENT OF EXHAUST GASES FROM INTERNAL COMBUSTION ENGINES
Jacque C. Morrell, 8 Oxford St., Chevy Chase, Md.
Filed Dec. 5, 1963, Ser. No. 328,397
12 Claims. (Cl. 60—30)

This invention relates to internal combustion engines and more particularly to apparatus or means and process for removing the objectionable and toxic components of exhaust gases from internal combustion engines by conversion of the same to harmless components.

The question of air pollution especially by automobile exhaust gases has focused attention on abatement legislation on a national scale. Carbon monoxide, a highly toxic substance in which 0.1% is dangerous to life is present in exhaust gases from automobiles to the extent of 9.0% to less than 1%, depending on operating conditions; and may average about 4% taking all conditions into account such as idling, heavy traffic, starting and stopping which is the norm in city driving where the menace is greatest. Trucks, busses and taxis all add to the menace, as even mere traces of carbon monoxide may be injurious and disagreeable causing headache, dizziness and the like; and in addition unburned and partially burned or oxidized hydrocarbons in the exhaust and carbonaceous materials not only are most disagreeable and malodorous but are assumed to be carcinogenic and therefore present the dangers of possible cancer. Other combustible components in the exhaust are hydrogen, and other compounds therein may include oxides of nitrogen, sulphur, and of metals principally lead.

The problem of removal or conversion of these objectionable components is a very complicated one mainly because of the many requirements which include taking into account changes in the composition and ratio of from lean to rich gasoline-air mixtures, traffic conditions including starting and stopping and variable speeds, changes in air exhaust gas ratios, exhaust gas stream temperatures and others all of which affect the problem in addition to the economic factors of minimum size, low cost, durability under all operating conditions and other factors.

The principal approach for the solution of the problem to date has been the use of oxidation catalysts, but these have been found to be very sensitive to temperatures above 1300° F. to 1400° F. under which conditions they rapidly lose efficiency and deteriorate. Moreover the temperatures must be above 550° F. to achieve any reduction and should be generally between about 800° F. and 1300° F. for maximum results. Also during the first 30 seconds or more of operation the catalyst does not work. To overcome these problems provision must be made for preliminary heating and diversion of the exhaust gas stream when the temperature gets too high as it frequently does and these difficulties in addition to the present requirements of (a) reduction in carbon monoxide from an average of about 6% to less than 1%, (b) reduction of 2000 to 6000 parts per million of hydrocarbons to an average of 275 p.p.m. and (c) life and functioning of the catalyst for at least 12,000 miles without reactivation; have presented a problem which still remains to be solved from a completely practical viewpoint.

I have overcome all of these problems in connection with my invention by utilizing high temperatures in the range of about 1,450° F. to 2,200° F. in effect above and outside the range of those processes employing low temperature sensitive catalysts described above in conjunction with the use of refractories or heat resistant non-metallic and/or metallic filling material in the combustion and/or oxidation zone including those surfaced or impregnated with rugged oxide catalysts preferably those oxides (and in some cases the silicates) of aluminum, magnesium, titanium, zirconium, beryllium, and the rare earths such as thoria, ceria and the like. It is to be emphasized that basically the simple ceramic and other high temperature refractories may be employed such as fireclays, fireclay brick, silica, magnesite, high alumina, chrome and zircon refractories, silicon carbides, sillimanite, mullite refractory porcelain shapes and others, but that it is contemplated employing also the simple refractories, properly coated and/or impregnated with oxides and metals or compounds which may be effective to some degree as catalysts; the overriding requirement being that they are resistant to high temperatures of the order referred to above. The refractories are preferably of suitable sizes and shapes so that when the combustion chamber is filled with them the interstices permit passage of the exhaust gases (and added air and fuel) to promote combustion of the exhaust gases without undue back pressures.

The filling material in the combustion chamber may be made into suitable shapes by methods well known to the refractory and ceramic arts passing through a plastic stage, e.g., (a) employing small amounts of oxy-chlorides as a binder, (b) use of gums such as gum tragacanth, agar and similar substances, (c) use of small amounts of rubber in an organic solvent; in all cases to bind and mold the base materials in finely divided form and thereafter carefully heating to high temperatures to sinter the oxides, etc. These methods are all conventional and are merely mentioned as examples and in general. I may employ all well-known and suitable methods to produce these refractories made of the materials referred to above. In general, wetting and pressing in green shapes and heating carefully to sintering temperature are the essence of making ceramic shapes. With regard to deposition or impregnating of more active catalytic surfaces these also may be prepared according to conventional methods, e.g., by precipitating a hydroxide or a hydrated oxide, or mixtures of the same with an oxide, impregnating or coating the surface of the materials mentioned above and drying at high temepratures. Oxides of various metals (as well as the metals themselves including the noble metals) may be employed for this purpose.

The refractory surfaces transmit heat from the burning mixture of gases once initiated and increase both the rate of ignition and of combustion and/or oxidation. The influence of the heat refractories is so pronounced that its effect has been designated as surface combustion. Silica, fireclay and various oxide materials definitely catalyze combustion chain reactions even at lower temperatures than those mentioned. Also heat transfer temperature effects coupled with local turbulence caused by surface roughness of a bed for example of broken refractory materials (which I also contemplate using) or of irregularly disposed refractory shapes and forms are of major importance in surface combustion at high furnace temperature. I may also employ grids functioning like checker work in a recuperative furnace and this of course is also made of refractory material.

High temperature alloys may also be employed in some cases instead of or in combination with the other filling materials. Moreover various combinations of all of the materials may be employed where found desirable. Aside from being a combustion surface in which flameless or surface combustion may take place, of the exhaust gases to which air is added, and to which extraneous fuel may be added (such as gasoline or a mixture of gasoline and air and/or the gasoline/air mixture from the crankcase known as "blowby") all to promote complete combustion within practical limits of the exhaust gas and to convert the carbon monoxide and hydrocarbons as well as carbon particles contained therein (to carbon dioxide and water or steam) by surface combustion and/or catalytic oxidation, the filling materials serves to thoroughly mix the exhaust gases and the added air and fuel after they enter the combustion chamber, although some mixing has taken place prior thereto. Combustion may be initiated by the ignition system and controlled by temperature sensitive means. As had been mentioned previously the shape and arrangement of the refractory filling in the chamber should be such as to accomplish the objective of as complete combustion as is practical without creating unnecessarily high back pressures. Reference to surface combustion above relates to the reactions between the oxygen in the air introduced in the chamber and the components of the exhaust gas (carbon monoxide, hydrocarbons, finely divided carbon, etc.) which are to be converted to carbon dioxide and water (steam) mainly as well as between the air present and the added fuel referred to above to maintain combustion of the exhaust gas or in general the surface combustion of all of the combustibles present in the gas streams entering the combustion chamber by the air on the surface of the refractory filling. The basis of the concept of surface combustion in my invention (with and without catalytic surfacing or impregnation of the refractory material) is the accepted concept that gas reactions are as a rule, catalyzed by solid surfaces, and very rapid combustion takes place, and the temperature rises rapidly (also it is quite possible to have such combustion without flames especially when the mixture of combustible gas and air approach theoretical requirements) and surface combustion occurs.

In addition to the above concept the presence of catalysts on the surface of a sufficiently rugged stability to function at the high temperatures of 1400 to 2200° F. more or less which may occur in the combustion chamber (generally 1500 to 2000° F.) may function even more completely; and of course is within the scope of the invention.

Among the principal other features of the inventions are the removal and recovery of heat produced in the combustion within the chamber. The outer wall of the refractory or high temperature combustion chamber may be cooled directly by the incoming air (and preheating the latter) by means of double walls around the chamber or the use of a tubular helical conduit around the same through which air or other cooling fluid may pass. Also the hot gases leaving the combustion chamber may be heat exchanged, in one or in a series of heat exchanges with the incoming air for combustion in the chamber, as well as with the exhaust gases leaving the manifold, or the muffler, in separate units or in combination as disclosed.

Another feature of the invention which in a sense may be optional is the treatment of the final exhaust product at low temperatures (800° F. to 1400° F. more or less) with catalysts which are generally not stable for use at the higher temperatures. With the removal (and utilization) of the heat of combustion generated in the refractory combustion chamber as described above the cooled exhaust gases and products generally of refractory surface and/or high temperature catalytic combustion will be in the range of temperature suitable for removal of any remaining (if any) carbon monoxide and hydrocarbons, etc. This is accomplished by treatment with additional air in the presence of selected low temperature oxidation catalysts such as metals and metal oxides on catalysts supports and other compounds such as iron and/or copper chromite supported on an alumina or other pelleted base. This modification of my invention is of course optional.

In all of the above steps or combinations thereof the exhaust gas originates in an internal combustion engine which of course is provided with a manifold or exhaust pipe to convey the exhaust gas to the combustion chamber. The air which is mixed with the exhaust gas prior to entering the refractory filled combustion chamber (in excess or to the extent required for practically complete combustion) is preferably heat exchanged in one modification of my invention; e.g., directly with the hot walls of the chamber. The added fuel which includes the crankcase gasoline-air mixture or blowby; or gasoline preferably after carburetion with air in a separate carburetor (e.g., such as is used in racing, "go-carts," chain saws, etc. of the diaphragm type) or from the main carburetor, is for the purpose of maintaining combustion of the components of the exhaust gas and is also introduced just prior to entering the combustion chamber (or may be introduced into the chamber at a common point) i.e., all of the components of the combustion mixture are prepared prior to entry into the combustion chamber wherein complete combustion occurs. The air may be introduced from a separate line or where practical be drawn from the filtered main supply to the engine. It is inherent in the process that while further mixing takes place in the chamber of the exhaust gases, the added air, the added fuel (gasoline or a mixture of the same with air); all combustion should occur within the refractory and/or high temperature catalytic chamber and the heat generated is removed and utilized by heat exchange.

Air and gasoline or mixtures of the same may be those supplied to the engine (i.e., from the same source) or provided especially for the combustion chamber in which case the motive power of the engine is used by suitable means (pulleys, etc.) to supply the same. Also the operation of the engine is coordinated by suitable means to supply the necessary air and fuel to the chamber.

In all cases means are supplied for igniting the combustible mixture after entry into the chamber.

Referring to the drawings: FIGS. 1a and 1b represent a diagrammatic side elevation view, partly in cross-section of the principal elements of my invention, with associated elements of the engine and automotive parts to enable a description of the process flow and functioning of the same. FIG. 2 shows alternative means and process for combustion of the exhaust gases and heat exchange of the highly heated products thereof with the incoming air used for combustion.

Referring now to the flow of reactants and materials in FIGS. 1a and 1b and starting with the internal combustion engine 1 itself and its various components which are part of the apparatus or means and process of my invention, the exhaust gases leaving the exhaust manifold system 2 through the exhaust conduit 3 into the combustion chamber 4 after passing through the pre-mixing chamber 15 referred to later. The combustion chamber 4 is filled with refractory material which may be of various shapes, sizes and composition to provide continued mixing of the various gases entering the chamber and surface combustion of the same, while at the same time allowing a free flow of the gases and combustion products without undesirable pressure drops. These refractories will be described in greater detail below. If desired a portion of the exhaust gases may be preheated with the air as described below by passing through line 3' controlled by valve 3". Also it may be noted that while the combustion chamber serves at least in part as a muffler, some form of the latter or of a resonator not shown may be employed in conjunction with the combustion chamber. Simultaneously air preferably drawn through a filter (a conveniently located special filter) or more preferably through the conventional air filter 5 of the automotive system is drawn through line 6 by means of an air blower or compressor 7 from which it passes into line 8. 8' is a safety valve to release excess air presure if necessary.

With regard to the preferred forced supply of air as described a very simple supplementary or standby system comprising an inspirator (not shown) using the venturi principle with filter, may be located on a bypass on the exhaust line 3 to maintain the proper air to exhaust ratio. Premixing zone 15 may also be equipped with ports (with closures) for admission of air as desired or observation and may be lined with ceramic or other refractory material as described in connection with the combustion chamber referred to later. Both of these expedients relating to control of air supply add flexibility to the one described below.

The air then passes through line 9 into the space 10 between the outer and inner walls of the combustion chamber which functions as a heat exchanger wherein the air (and/or exhaust gas) may be preheated and simultaneously cools the walls of the combustion chamber. Alternatively other heat exchange means, e.g., such as is shown in FIG. 2 to be described later may be employed for the same purpose. In either case the outer wall of the chamber is suitably insulated to control excess and undue heat emanating therefrom. (This insulation may consist of glass wool or slag wool or asbestos in compact form to conform to the shape of the combustion chamber held in place by metal straps or bands or appropriately contained in a thin metal shell not shown.)

Alternatively air may be passed without preheating through line 9' controlled by valve 9'' through line 14 and the premixing chamber 15 into the combustion chamber 4.

The preheated air after passing between the double walls of the combustion chamber leaves through line 12 and passes through lines 13 and 14 into the premixing chamber 15 where it is mixed with the exhaust gases in controlled proportions to obtain substantially complete combustion of all combustible components; also it is preferable that the proportion of air to combustibles be within the limits of inflammability. Preheated air from line 13 may be passed through line 29 controlled by valve 29' and into the combustion chamber to assist in completing the combustion of the combustible materials in the exhaust gases and in general flowing through the combustion chamber. In this connection it is noted that I may employ non-equivalently (as an alternative to the space between the two walls) a helical coil on the outer wall of the combustion chamber extending around the circumference and length thereof to preheat the air.

Simultaneously with the introduction of air and exhaust gases into the combustion chamber a mixture of gasoline and air preferably corresponding approximately to the mixture leaving the carburetor and entering the cylinders of the engine is introduced in controlled proportions into the combustion chamber. Preferably this mixture of gasoline and air is that which originates in the crankcase of the automotive system itself and is known generally as "blowby." The blowby gases as the name indicates are those escaping unburned from the cylinders of the engine on the upstroke of the pistons into the crankcase and normally through the draft tube of the latter into the atmosphere. It is estimated that they may account for as much as 40% of the total hydrocarbons escaping from the system and exhausted into the atmosphere including those in the exhaust gas itself; and thus constitute a nuisance along with the unburned and partially burned hydrocarbons, the carbon monoxide and hydrogen and the finely divided carbonaceous substances in the exhaust gases.

Thus in addition to getting rid of the nuisance of the blowby gases as such (in composition approximately the normal mixture of unburned gasoline vapors and air) they may be used as fuel to augment the combustible substances in the exhaust gases referred to above (carbon monoxide, hydrogen, unburned and partially burned hydrocarbons, carbonaceous materials and the like), especially where the latter are in too small proportions, due to variable operating conditions to support the desired combustion and/or to remove and/or convert all of the undesirable components from the exhaust gases.

Reverting to the supply of blowby gases originating, as a result of escape from the cylinders, in the crankcase, as described above, and flowing through the draft tube 16 into reservoir 17 (shown with breather 17'), and through lines 18 and 19 and 20' from which it is transferred by means of blower or compressor 20 and through lines 21 and 21' into the pre-mixing zone 15 wherein the gasoline-air mixture is admixed with the air and exhaust gas mixture in mixing zone 15 and passes into the combustion chamber where combustion is initiated and mixing and combustion is completed.

Additional gasoline-air mixture or other fuel in addition to the blowby may be introduced as described into the system as necessary or desired for example through line 23 controlled by valve 23' from the carburetor or intake manifold of the automotive system or from a special carburetor (not shown), e.g., of the diaphragm type used in racing "go-carts"; or from any suitable source. Normally however the blowby is adequate to serve the purpose. Valve 23' which controls the supply of auxiliary fuel may be of the throttle or other type which may be readily controlled from the panel or adjusted as desired or found necessary. Preferably a special control means in addition to valve 23' is employed to supply and regulate the flow of the gasoline-air mixture from the carburetor source referred to above and flowing through line 23 which consists of an electrically activated solenoid valve C located on a bypass 23''. In this preferred case the manually controlled valve 23' is set to admit a predetermined supply of gasoline-air mixture (according to requirements in addition to the blowby gasoline-air mixture) and the solenoid on the bypass 23'' is energized by a temperature sensitive switch located in the outlet of the combustion chamber to increase the flow of fuel to the latter when the temperature therein falls below a predetermined level, e.g., about 1450° F.

Power for the blowers or compressors 7 and 20 may be taken off the main crank shaft directly or through gear train indicated at 22 or from any convenient source. The source of power which in general is the engine itself may be used in the conventional manner for the fan shown at 24, the main water pump 25, the generator 26, and also for the auxiliary water pump 27 (the function of which will be discussed later) and may be transmitted through the belt and pulley systems $a$, $b$ and $c$, respectively.

Special control means for regulating the supply of air consists of a solenoid valve A with byppass line 6' controlled by manually set valve 6''. The amount of air passing through line 6 increases with the speed of the engine, but may be normally controlled by adjusting the bypass line 6' and valve 6''. The bypass valve is adjusted to supply the required amount of air for normal combustion whereas the solenoid valve which is controlled by the temperature in the combustion chamber admits a larger flow of air when the temperature in the combustion chamber drops below a predetermined point. In this connection dependent upon the characteristics of the the automotive vehicle, its age, mode of operation and other factors, the normal operation may be to decrease the normal air supply (by suitably setting of the solenoid valve on the air line) when the temperature drops while increasing the fuel supply to the combustion chamber as described to conform to the requirement resulting from reduced combustibles in the exhaust. Likewise the auxiliary fuel supply in the form of the gasoline and air mixture from the blowby source (and/or the regular carburetor or other special source) may be controlled by the solenoid valve B increasing when the temperature falls below a predetermined point by opening the solenoid valve and providing the normal requirement through the bypass 19' valve 19'' for normal operation. It is of course to be understood as indicated that when required the solenoid valves may be set as desired for increase of fuel and/or air and in any event to maintain the mixtures within proper limits. For example, the system is flexible enough so that when the combustibles normally in the exhaust reach a maximum during idling or in traffic only the blowby is added to the exhaust and a solenoid valve similar to B and similarly actuated (shown above) is located on a bypass around valve 23' to control the supplementary fuel supply, and as explained the air supply to the chamber may be increased with increased fuel added or decreased as described above.

The principal purpose or objective of the apparatus and process of my invention is to remove obnoxious, toxic and dangerous components of the exhaust gases from the internal combustion engine, such as carbon monoxide, unburned and partially burned hydrocarbons (which may also include blowby), carbonaceous particles and the like by converting the same through high temperature surface combustion or semi-catalytic combustion to carbon dioxide and water. In order to do this the combustion chamber 4 contains a refractory or ceramic filling designated as 4' of various shapes and forms which may also in some cases be made non-equivalently of refractory alloy metals to allow free passage with minimum pressure drop through the combustion chamber consistent with maximum combustion surface which may be of a semi or quasi catalytic nature to provide surface combustion and in any event a surface which is resistant to and which functions at higher temperatures than the relatively low temperature oxidation catalysts heretofore proposed and generally employed for the same objectives of purifying the exhaust gases. The low temperature types of catalysts are generally rendered inactive above temperatures, e.g., in the range of about 1400° F. to 1500° F. and which function best in the range of 1000° F. to 1500° F. whereas my refractory surface combustion materials may function efficiently at temperatures above approximately 1400° F. to 1500° F. and up to temperatures of about 2000° F. to 2200° F. The filling material may be a single grid cylindrical in form or made up of a sequence of cylindrical grid sections which function like brick checker work in a recuperative furnace and allow free flowing of the gases or it may be made of various shapes and forms, e.g., like those used in a packed distillation or fractionating column. These shapes may take the form of short hollow cylinders, or the latter with helicoid centers or "Berl" saddles, or spheres with perforated centers and in fact any geometric form which provides large or maximum surfaces without restricting the free flow of the gases. It is noted in this connection that even globular or broken refractory material may provide 35% to 45% of interstitial space and may under some circumstances be used although preferably suitably sized special shapes of the types described above.

The composition of the filling material preferred by me has already been referred to and in geneal may be of a refractory type, e.g., ceramic nature, resistant to high temperatures and may include high temperature resistant alloys. The refractory fillings may be made of the rugged oxides which provide surface combustion and which may at the same time have catalytic properties to promote oxidation at the high temperatures employed without objectionable deterioration of the material itself. These oxides may include those of iron, aluminum, magnesium, titanium, zirconium and others and the rare earths made up in the shapes described above or the filling material made of simple ceramic and other high temperature refractories such as fireclays and fireclay brick, silica, magnesite, high alumina, chrome and zircon refractories, silicon carbide, silimanite, nullite, etc. These refractories may be used as such they may be coated or impregnated with the high temperature resistant catalytic oxides. The simple refractories are however satisfactory when used alone as they function to provide surface combustion under the conditions existing in the combustion chamber.

The combustion chamber inner wall 28 may also be lined with a fire clay, ceramic or refractory lining (not shown) generally both to protect the metal as well as to furnish suitable surface to further promote combustion. It is obvious from what has been stated that a very wide variety of materials and compositions in a wide variety of shapes and various combinations thereof may be employed in the combustion chamber in connection with my invention.

In addition to providing a combustion surface on which flameless or surface combustion of the exhaust gases may take place in admixture with the added fuel, and the requisite air provided for the same, the filling material serves to thoroughly mix the exhaust gases with the air and the added blowby or other gases to complete the premixing in zone 15. The basis of the phenomenon of surface combustion in my invention on the surface of the refractory filling material 4' is the generally accepted concept that gas reactions as a rule are catalyzed by various solid surfaces and very rapid combustion takes place and the temperature rises rapidly. When the mixture of fuel and air approaches theoretical requirements, the surface combustion may be of the flameless type.

Referring now to the surface combustion chamber the gases enter the mixing zone 15 and pass into the chamber proper 4. Preheated air from line 13 may enter thru line 29 controlled by valve 29' to furnish air at a point intermediate between the entry and exit of the combustion chamber to complete combustion of unburned material therein. Ignition of the mixture is accomplished by spark plug 30. Pyrometer 3 is connected by leads 31" to a temperature indicator 31' which may be located on the panel to permit observation of the temperature in the chamber. The hot exhaust gases leave the combustion chamber thru lines 32, 32a and 32b and may pass into heat exchange with cooling water in heat exchanger 33 equipped with pipe lines or conduits for water 33'. The purpose of this is to cool the highly heated gases before exhausting into the atmosphere; the gases are free to be exhausted otherwise; although cooling is preferred. The cooled and purified exhaust gases are finally passed thru line 34 into the atmosphere.

It may be noted that the temperatures within the combustion chamber may go even above the desired limit of about 220° F. and in general the upper temperature limits are set mainly on the basis of the material requirements including both the metal from which the combustion chamber is made as well as the refractory materials used including in some cases materials having substantial catalytic properties. With regard to the metal it is desirable to employ high temperature alloys even though the chamber may be lined with ceramic or other types of linings or coatings. This not only assures resistance to high temperatures, but also to oxidation of the metal and minimizing warping of the chamber. A large number of such alloys which may contain chromium, cobalt, nickel and other additives (and are sold under trade names such as Chromalloy, Hastelloy, Inconel, and various stainless types) are available and their use is preferred.

The cooling water for the hot gases may be withdrawn from the radiator 35 and may be pumped thru line 36 by water pump 25 and thru line 37 controlled by valve 37' into lines 38 and 39 into pipe coil 33' and back into the radiator 35 thru lines 40, 41, 42 controlled by valve 42'. Line 43 controlled by valve 43' is the conventional cooling water system to the radiator. Alternatively the water may be pumped by auxiliary pump 27 from the radiator 35 thru line 27' controlled by valve 27" and out thru lines 38 and 39 into the cooling coil 33'. Line 38' is the conventional cooling water lead into the engine block.

Thermal switch 44 sensitive to changes in temperature located in outlet 32 of combustion chamber 4, controls the spark plug 30 and the solenoid valves A, B and C which control the flow of air and fuel to the combustion chamber when the temperature drops therein as a result of imbalance in combustible materials in the exhaust gases and otherwise. It is noted in this regard that at the beginning of the operation the temperature is below that for steady operation so that the spark plug is energized for intermittent spark on closing the manual switch until the temperature rises above about 1450° F. The spark plug 30 which is grounded, is connected by line 49 to the ignition coil 45, the interrupter 47 and condenser 48 and is controlled thereby. This latter arrangement as well as the electrical control system generally is more or less conventional and variations of this and other control systems may be employed. The solenoid valves A, B and C are controlled respectively through line 50, 51 and 46' connected by line 46. The source of power for all of these electrical components is the storage battery, 52 (grounded at 52') and in addition to thermal switch 44 there is a principal manual switch 53 for control which may be located on the panel. The battery, spark plug and solenoid valves A, B and C are grounded, the latter as shown at 51', 50' and 55 respectively. Manual switch 53' may be employed to cut out solenoid valve B and switch 46" may be likewise employed to cut out solenoid valve C as desired. Both of these valves are energized by thermal switch 44 when the temperature drops below about 1450° F.

Referring to FIG. 2 combustion chamber corresponding in general to that in FIGS. 1a and 1b designated as 4 and the premixer and inlet and outlet tubes serve the same function as those corresponding parts already described. The combustion chamber in FIG. 2 likewise has a refractory filling material corresponding to 4' is of the same types as already described in connection with FIGS. 1a and 1b. The essential difference is that the combustion chamber in FIG. 2 does not have double walls with a space between to preheat the air but instead employs the heat exchanger 9 to serve this purpose and in addition to cool the gases leaving the combustion chamber. It is noted here that the use of a preheat device to heat the incoming air to the combustion chamber and to partially remove heat from the hot gases of the combustion chamber is a most desirable and in effect as essential feature of my invention, and especially in the arrangement shown in FIG. 2 wherein the highly heated gases leaving the chamber both preheat the air for combustion in the chamber and simultaneously cool the highly heated gases before passing thru heat exchanger 33 wherein they may be further cooled if desired or necessary by circulating water. It is also noted that a similar device and/or arrangement similar to heat exchanger 9 and in series therewith could be used employing cooling water and that the cooling coil 33' described in connection with the process and apparatus described in connection with FIGS. 1a and 1b could be dispensed with. It is thus clear that the specific type of heat exchange devices are illustrated in FIGS. 1a and 1b and in FIG. 2 but that my invention is not limited thereto.

Further describing FIG. 2, 67 represents the walls of the combustion chamber with insulating material externally to minimize or prevent excessive heat radiating from the outer surface wall 67 and ceramic or similar lining 66' to minimize oxidation and overheating of the inner surface of the wall 67. The ends of the chamber are of course similarly situated. Corresponding also to chamber 64 (with refractory filling 64') in FIGS. 1a and 1b the exhaust gas enters the premixer 65 and chamber through conduit 62, the air through line 63 and the blowby or other air-fuel mixture and/or fuel enters through line 4 and as described and premixing occurs in zone 65 corresponding to 15 in FIG. 1a. The highly heated gases leave through exit tube 68 and enter zone 70 passing through the tubes designated as 71 and into zone 70' and then through exit conduit to the atmosphere or as described for the gases passing from exit tube 32 in FIG. 1b for additional cooling before exhausting to the atmosphere. Air for combustion originating as described in connection with FIGS. 1a and 1b may be passed through line 73 around tubes 71 and out line 73' to enter line 63 and the premixer and combustion chamber as already described operation of the system which includes FIG. 2 may otherwise be carried on as has already been described in connection with FIGS. 1a and 1b and with the exceptions already noted the two systems may have almost identical apparatus parts and operating features and may have substantially the same operating features and objectives. Also it may be noted that the details noted in both systems (FIGS. 1a and 1b and FIG. 2) are by way of example only and variations having the same or equivalent functions are within the scope of my invention, the main objective of which is to purify the exhaust gases from an internal combustion engine and remove the carbon monoxide and other objectionable components therein by conversion to harmless substances in accordance with the principles set forth above. 64 and 64' in FIG. 2 corresponds to chamber 4 and refractory filling 4' respectively as shown in FIGS. 1a and 1b.

*Operating conditions and examples*

The operating conditions within the combustion chamber especially the preferred temperature range of about 1500° to 2000° F. (and more generally about 1400° to 2200° F.) have already been set forth. The aim with regard to existing pressures in the entrance to the combustion chamber and exit and in the system generally has already been described as very little departure from that existing in the conventional muffler system for example at the entrance and exit of the muffler and tail pipe varying only from slightly above atmospheric pressure at the entrance to substantially about atmospheric pressure at the exit. The main objective of course is to disturb the operation of the engine as little as possible and to maintain it within practical limits with regard to existing pressures. I may however vary these pressures within operating limits.

*Air-fuel ratios*

In order to obtain complete combustion it is desirable to maintain some excess of air over the theoretical required for combustion. This demands a variable air supply and air-exhaust ratio over a relatively wide range and this has been difficult to do in the conventional low temperature (800° F. to 1400° F.) catalytic processes for oxidation of the objectionable combustibles in the exhaust for several reasons: (a) The carbon monoxide, hydrogen and hydrocarbon contents of the exhaust gases are highest when the engine is idling and under heavy traffic conditions and a relatively high ratio of air to exhaust is required to oxidize the same; (b) the temperature rise of the exhaust gases and of the catalyst due to the catalytic oxidation reaction is rapid and high and may get out of control for satisfactory operation since the catalyst is sensitive to temperatures above about 1400° F. to 1500° F. and its effectiveness may even be destroyed or greatly deteriorated; (c) the situation is the reverse at cruising and at higher speeds and when the engine is operating most efficiently as the concentration of conbustibles in the exhaust and the air requirement is at a minimum. Under these conditions a substantial excess of air could cool the catalyst below the minimum temperature at which it is effective and the sensible heat normally provided by the hot exhaust is insufficient due to the cooling effect to maintain the desired reaction. This is especially true of diesel engines where the initial temperature of the exhaust is lower than with the spark ignition types. It is also noted that the catalysts used in connection with catalytic oxidation processes and where leaded gasolines are used are very sensitive to deposition of lead oxide and other lead compounds and are greatly depreciated thereby. This is not so in my process since the combustion of leaded gasoline in the engine and the resulting lead oxides in the exhaust do not adversely affect the efficiency of the refractories used by me.

In my invention the temperature limitations imposed upon the catalyst are not present as the effective operating range is from about 1500° F. to 2000° F. more or less, and the surface combustion refractory material which in this sense functions as a semi-catalyst to facilitate combustion, is not affected by these higher temperatures and this problem is eliminated. Moreover since additional fuel is added in the form of the blowby gases (and if necessary supplementary carburetor fuel air mixture may be provided to the combustion chamber as described) the conditions referred to above where the combustibles in the exhaust gases are at a minimum are absent in my method and process. The fuel added is under control and is not affected by any changes in the combustible content of the exhaust gases. Therefore the air exhaust ratio may be correlated to supply sufficient air through the bypass line as described to maintain a sufficient excess for complete combustion with the maximum normal combustible components in the exhaust gases (from about 4.5% to 9% carbon monoxide, about 2% to 4% hydrogen and about 0.1 to 0.5 of hydrocarbon vapors, all by volume) although it must be recognized that at cruising speeds the concentration of these components may fall considerably below these figures. At the other end of the scale while it is preferable that the total concentration of combustibles be maintained above the minimum flammable limit, it is noted that my process has a considerable degree of flexibility in that the hydrocarbon combustible content of the exhaust gases may be increased by the addition of the blowby gases and/or additional carburetor fuel-air mixture and particularly when the temperature falls below about 1450° F. to 1500° F. (or any predetermined temperature) provision is made for both air and fuel to be increased, or the air to be decreased and the fuel (or a fuel-air mixture to be increased and in any event an external source of heat other than the combustibles normally present in the exhaust gases is provided. It is also noted in this connection that at the temperatures prevailing during normal operation of my process (above about 1450° F.) and with the refractory filling of the types described in the combustion chamber, oxidation of the carbon monoxide and other combustibles noted will proceed to completion as a result of the semi-catalytic effect and surface combustion.

Generally it has been found by me that the addition of air in the range of about 30% to 80% (and upward) and preferably between 50% to 60% based on the volume of the exhaust gases will meet the requirements, and the arrangements and the systems are provided to supply the air as required; also it is noted that, normally, added fuel is approximately of carburetor composition and carries its own air supply, although other fuel may be employed.

*Specific example*

In one operation as an example employing an approximate air-fuel ratio of from 13:1 to 15:1 by weight under idling conditions the analysis of the exhaust gases form an automobile without treatment may show about 6% carbon monoxide and amounts varying from about 3% to traces of hydrogen and about 0.2% hydrocarbons all by volume. Under cruising conditions these concentrations would be considerably diminished but the average under all driving conditions including stopping and starting in heavy traffic may amount to about 4% carbon monoxide, from about 2% to traces of hydrogen and about 0.1% hydrocarbons in addition to partially oxidized hydrocarbons and carbonaceous substances in both cases. The blowby gases in this type of operation showed roughly the same composition (but of course is very much less in volume) as the carburetor mixture of gasoline and air which contained about 6% to 8% of gasoline by weight and about 2% and upward by volume. Based on the volume of the blowby gases and the hydrocarbon content the addition of the latter to the exhaust increased the hydrocarbon content by about 0.1% or somewhat more by volume which in my process is normally introduced into the exhaust gases entering the combustion chamber. Operating under the described conditions of substantially atmospheric pressure and a normal temperature range of about 1450° F. to 2000° F. in the combustion chamber with occasional additions of gasoline-air mixtures of carburetor composition when the temperature drops below about 1450° F. to 1500° F. a reduction of the carbon monoxide content from an average of about 4% to about 0.2% and/or less and in general less than about 0.5% may be obtained depending upon operating conditions. The carbon monoxide and the carbonaceous materials are converted to carbon dioxide, and the other combustibles including hydrogen and hydrocarbons are oxidized and converted to carbon dioxide and water.

As mentioned above I may employ for example the hot gases from the combustion chamber 4 after some cooling in the heat exchanger 33, e.g., down to from 800° F. to 1200° F. (and up to 1400° F.) may be contacted with an oxidation catalyst, e.g., copper or iron chromites deposited on alumina to remove last traces of carbon monoxide although the process already described produced satisfactory results and is of course uncomplicated by the use of sensitive catalysts.

It is obvious that the highly heated gases leaving the combustion chamber 4 are a very substantial source of power which could be converted under pressure (as by being produced under pressure) to turbine power for auxiliary use in conjunction with the regular piston engine power or separately and this especially becomes significant when it is considered that vary much more potential power leaves through the exhaust than is utilized; and moreover it is potentially very greatly increased in my process. It is also obvious that my process may be applied to many industrial processes and uses wherein objectionable gases and odors are produced which should be eliminated and I intend to utilize the same in this connection.

By the term refractory materials as used in the claims I mean materials of the type described which are not damaged by heating to temperatures even above the maximum employed by me and for example of the types set forth and described by Etherington, Modern Furnace Technology (2nd ed., 1944, pp. 379–436) and Griswald, Fuels (Combustion and Furnaces, McGraw-Hill, 1946, pp. 333–357.

It is understood that there are many variations and departures within the scope of the principles I have disclosed in connection with my invention and I desire to be limited only by the broad spirit and scope of my invention and the claims relating thereto.

I claim:

1. In combination with an internal combustion engine a conduit for conveying exhaust gases from the engine to an exhaust purifier, the improvement which comprises a combustion chamber with an inlet and an outlet, a refractory material disposed within the combustion chamber to provide combustion surfaces in the combustion chamber and through which the exhaust gases are passed from the inlet, means to supply a controlled forced flow of air and separate means to supply a controlled flow of fuel which is at least in part of the type and from a source supplied to the said engine to the combustion chamber, means for mixing the exhaust gases, the air and the fuel located at the inlet of the combustion chamber and before entering the same, a spark plug located in the inlet side of the combustion chamber to ignite the combustible materials entering the chamber, means for cooling the highly heated combustion products by indirect heat exchange with incoming air and for simultaneously preheating the air and means for discharging the purified exhaust into the atmosphere.

2. In combination with an internal combustion engine having a conduit for conveying exhaust gases from the engine to an exhaust purifier, the improvement which comprises a combustion chamber with an inlet and an outlet, a refractory material within the combustion chamber to provide combustion surfaces in the combustion chamber and through which the exhaust gases are passed from the inlet, electrically activated valve means to supply a controlled flow of air and separate electrically activated valve means to supply a controlled flow of fuel to the combustion chamber, means for mixing the exhaust gases, the air and the fuel located at the inlet of the combustion chamber, a spark plug located in the inlet side of the combustion chamber to ignite the combustible materials entering the chamber, temperature responsive switch means located in the outlet of the combustion chamber to electrically activate the spark plug and the valves which change the rate of flow of the air and fuel, means for cooling the highly heated combustion products by indirect heat exchange with incoming air and for simultaneously preheating the air and means for discharging the purified exhaust into the atmosphere.

3. The combination with claim 1 in which the fuel is in part the crankcase blowby and means are provided to withdraw the same from the crankcase and supply to the combustion chamber.

4. The process of treating exhaust gases from an internal combustion engine to convert and remove toxic, deleterious, odoriferous and objectionable compounds contained therein such as carbon monoxide, hydrocarbons, partially oxidized hydrocarbons, carbonaceous substances and the like which comprises subjecting the said exhaust gases to temperatures within the range of about 1450° F. to about 2200° F. in the presence of added air and added fuel a portion of which is the crankcase gasoline-air blowby mixture and in the presence of a refractory material whereby the objectionable substances are converted at least in part by combustion and oxidation to relatively harmless and unobjectionable substances such as water and carbon dioxide, passing the incoming added air into heat exchange with the highly heated gaseous products of combustion whereby to heat the said air and relatively cool the hot gases leaving the chamber and discharging the thus treated and purified exhaust gases to the atmosphere.

5. A process such as is claimed in claim 4 wherein additional fuel is supplied to the process when the temperature drops below about 1450° F.

6. The process of treating exhaust gases from an internal combustion engine to convert objectionable components therein to purify the same and render them less objectionable which consists in mixing the exhaust gases with a controlled supply of air and added fuel of the type supplied to the said engine, passing the mixture of exhaust gas, air and fuel into a combustion chamber, igniting the mixture and passing the same into contact with refractory material whereby to obtain further mixing and combustion and oxidation on the surfaces of the said refractory material thereby raising the temperature of the gaseous material within the combustion chamber, maintaining the temperature wihin the combusion chamber within a temperature range of about 1450° F. to about 2200° F., supplying additional fuel when the temperature falls below about 1450° F., discharging the highly heated exhaust gases and products of combustion from the combustion chamber and exhausting the purified exhaust gases to the atmosphere.

7. The process of treating exhaust gases from an internal combustion engine to convert objectionable components therein to purify the same and render them less objectionable which consists in mixing the exhaust gases with a controlled supply of air and added fuel consisting of blowby gasoline-air mixture from the crankcase and additionally of the type supplied to said engine, passing the mixture of exhaust gas, air and fuel into a combustion chamber, igniting the mixture and passing the same into contact with refractory material whereby to obtain further mixing and surface combustion and oxidation of the said exhaust gases and added fuel thereby raising the temperature of the gaseous material within in the combustion chamber, maintaining the temperature within the combustion chamber within a temperature range of about 1450° F. to about 2200° F. supplying additional fuel when the temperature falls below about 1450° F., discharging the highly heated exhaust gases and products of combustion from the combustion chamber and heat exchanging the hot gases with the incoming air supply to the combustion chamber while simultaneously cooling the heated gases correspondingly and exhausting the purified exhaust gases to the atmosphere.

8. The process of treating exhaust gases from an internal combustion engine to convert objectionable components therein to purify the same and render them less objectionable which consists in mixing the exhaust gases with a controlled supply of air and added fuel consisting of blowby gasoline-air mixture from the crankcase of the engine, passing the mixture of exhaust gas, air and fuel into a combustion chamber, igniting the mixture and passing the same into contact with refractory material whereby to obtain further mixing and surface combustion and oxidation of the said exhaust gases and added fuel thereby raising the temperature of the gaseous material within the combustion chamber, maintaining the temperature within the combustion chamber within a temperature range of about 1450° F. to about 2200° F. supplying additional fuel consisting of gasoline-air mixture of carburetor composition when the temperature falls below about 1450° F., discharging the highly heated exhaust gases and products of combustion from the combustion chamber and exhausting the purified exhaust gases to the atmosphere.

9. The process of treating exhaust gases from an internal combustion engine to convert objectionable components therein to purify the same and render them less objectionable which consists in mixing the exhaust gases with a controlled supply of air and added fuel consisting of blowby gasoline-air mixture from the crankcase of the engine and gasoline-air mixture from a carburetor, passing the mixture of exhaust gas, air and fuel into a combustion chamber, igniting the mixture and passing the same into contact with refractory material whereby to obtain further mixing and combustion and oxidation on the surfaces of the said refractory material thereby raising the temperature of the gaseous material within the combustion chamber, maintaining the temperature within the combustion chamber within a temperature range of about 1450° F. to about 2200° F. supplying additional fuel when the temperature falls below about 1450° F., discharging the highly heated exhaust gases and products of combustion from the combustion chamber and heat exchanging the hot gases with the incoming air supply to the combustion chamber while simultaneously cooling the heated gases correspondingly and exhausting the purified exhaust gases to the atmosphere.

10. A process such as is claimed in claim 4 wherein the added fuel consists of both blowby gasoline air mixture from the crankcase and gasoline-air mixture of carburetor composition.

11. The process of treating exhaust gases from an internal combustion engine to convert and remove toxic deleterious, odoriferous and objectionable compounds contained therein such as carbon monoxide, hydrocarbons, partially oxidized hydrocarbons, carbonaceous substances and the like which comprises subjecting the said exhaust gases to temperatures within the range of about 1450° to about 2200° F. in the presence of a forced supply of added air and added fuel of the type and from a source supplied to the said internal combustion engine whereby the said objectionable substances and the added fuel are substantially converted by combustion and oxidation to relatively harmless and unobjectionable substances such as water and carbon dioxide and thereafter discharging the thus treated and purified exhaust gases to the atmosphere.

12. The process of treating exhaust gases from an internal combustion engine to convert and remove toxic, deleterious, odoriferous and objectionable compounds contained therein such as carbon monoxide, hydrocarbons, partially oxidized hydrocarbons carbonaceous substances and the like which comprises subjecting the said exhaust gases to temperatures within the range of about 1450° F. to about 2200° F. in the presence of crankcase gasoline and additional fuel of the type and from a source supplied to the said internal combustion engine and a forced supply of added air whereby the said objectionable substances in the exhaust gases and the crankcase gasoline and additional fuel are substantially converted by combustion and oxidation to relatively harmless and unobjectionable substances such as water and carbon dioxide, and thereafter discharging the thus treated and purified exhaust gases to the atmosphere.

References Cited by the Examiner

UNITED STATES PATENTS

| | | | |
|---|---|---|---|
| 1,605,484 | 11/1926 | Thompson et al. | 23—288.3 |
| 1,847,506 | 3/1932 | White | 60—30 |
| 1,858,637 | 5/1932 | McDonald | 60—30 X |
| 1,875,024 | 8/1932 | Kryzanowsky | 60—30 X |
| 1,897,746 | 2/1933 | Winslow | 60—30 |
| 2,038,567 | 4/1936 | Ittner | 60—30 X |
| 2,203,554 | 6/1940 | Uhri et al. | 60—30 |
| 2,807,930 | 10/1957 | Bratton | 60—30 |
| 2,937,490 | 5/1960 | Calvert | 60—30 |
| 2,956,865 | 10/1960 | Williams | 60—30 X |
| 3,050,376 | 8/1962 | Bishop et al. | 60—30 X |
| 3,061,416 | 10/1962 | Kazokas | 60—30 X |
| 3,071,449 | 1/1963 | Shustack | 23—288.3 |
| 3,073,684 | 1/1963 | Williams | 60—30 X |
| 3,088,271 | 5/1963 | Smith | 60—30 |
| 3,131,533 | 5/1964 | Vandenberg | 60—30 |

FOREIGN PATENTS 413,967  7/1934  Great Britain.

SAMUEL LEVINE, *Primary Examiner.*

EDGAR W. GEOGHEGAN, *Examiner.*

A. S. ROSEN, *Assistant Examiner.*